Jan. 23, 1951     E. W. WAGNER     2,538,813
FENDER PROTECTOR
Filed Oct. 10, 1947
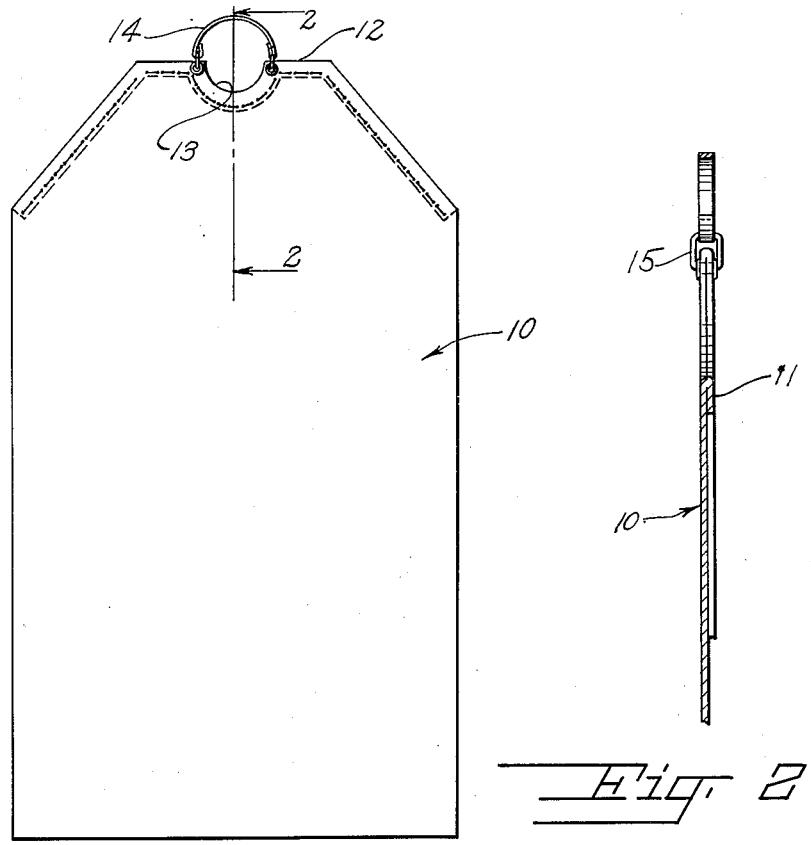
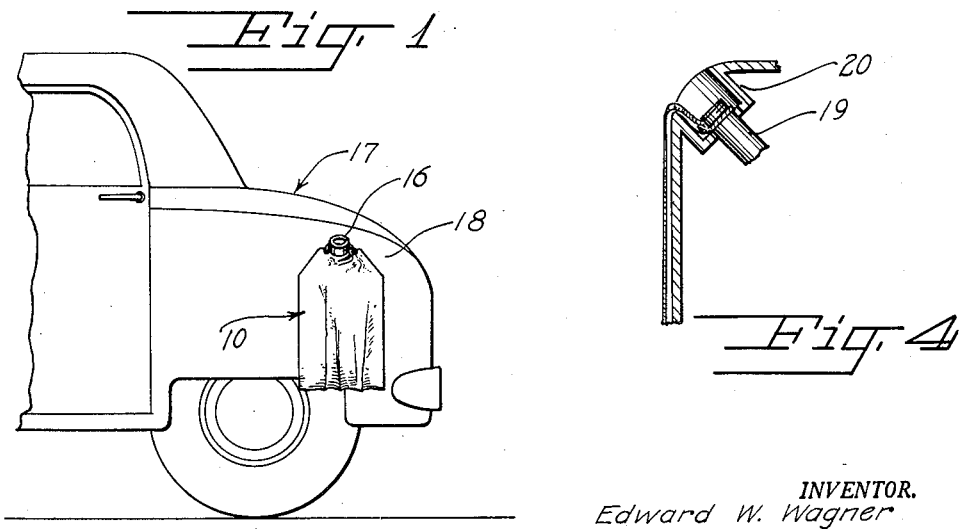
INVENTOR.
Edward W. Wagner
BY
McMorrow, Berman + Davidson
Attorneys Patented Jan. 23, 1951

2,538,813

UNITED STATES PATENT OFFICE 2,538,813

FENDER PROTECTOR

Edward W. Wagner, Parma, Ohio

Application October 10, 1947, Serial No. 779,139

4 Claims. (Cl. 226—129)

This invention relates to a protector for protecting the fender of a vehicle during the discharge of gasoline into the tank.

An object of this invention is to provide a protecting apron which is formed of flexible material impervious to gasoline, which is adapted to be detachably coupled to the filler neck of the gasoline tank for suspension from the filler neck so that the fender of the vehicle adjacent the filler neck will not have any gasoline spilled thereon and the finish of the fender damaged by the gasoline.

Another object of this invention is to provide a protecting apron of this kind which can be detachably mounted on different types of vehicles and filler necks.

A further object of this invention is to provide a protecting apron for vehicle fenders of this kind which is of simple construction, and includes a quick attaching means whereby the device may be secured to a filler neck very quickly and also quickly detached therefrom without injury to the neck or to any portion of the vehicle.

With the above and other objects in view, my invention consists in the arrangement, combination and details of construction disclosed in the drawings and specification, and then more particularly pointed out in the appended claims.

In the drawings:

Figure 1 is a detailed side elevation of a fender protecting apron constructed according to an embodiment of this invention, Figure 2 is a fragmentary sectional view taken on the line 2—2 of Figure 1, Figure 3 is a detailed side elevation of the device in applied position, and Figure 4 is a fragmentary sectional view showing the apron mounted on a filler neck which is countersunk in a fender.

Referring to the drawings, the numeral 10 designates generally a flexible sheet which is formed of flexible plastic, rubber or other suitable material which is impervious to gasoline.

The sheet 10 is formed with a truncated triangular upper portion and the marginal edge of the upper portion is formed with a reverted portion 11 which may be either stitched or adhesively secured to the adjacent face of the sheet 10.

The apex or top 12 of the sheet 10 is formed with a semi-circular cutout 13 and a short strap 14 is secured by connecting loops 15 to the sheet 10 and forms with the cutout 13 a circular upper attaching means whereby the sheet 10 may be secured at its upper portion to the filler neck of the gasoline tank of a vehicle.

The strap 14 may, if desired, be formed of elastic material so that the strap can be used for different diameters of filler necks.

In Figure 3 the filler neck 16 of the vehicle 17 projects outwardly through the fender 18. With a construction of this kind, the strap 14 can readily be disposed about the neck 16 thereby leaving the apron or protecting sheet 10 in depending relation on the outer side of the fender 18.

Where the filler neck 19 is countersunk in a well 20 as shown in Figure 4, the tapered upper end of the apron 10 is extended into the well 20 and the strap 14 then slipped over the neck 19 as shown in Figure 4. In the event any gasoline is spilled out of the filler neck, the gasoline will run down the protecting apron 10 and this apron is preferably of sufficient length to extend downwardly over the full side or depth of the fender 18. In this manner the spilled gasoline will not contact the finish of the fender so that the finish will not be damaged by the gasoline.

I do not mean to confine myself to the exact details of construction herein disclosed but claim all variations falling within the purview of the appended claims.

Having thus described my invention, what I claim is:

1. A device for protecting an automobile fender from spilled gasoline during introduction of gasoline into a gasoline tank filling neck present at the upper part of the fender, said device comprising a gasoline impervious sheet of sufficient vertical length to depend in covering relation to the fender from the filling neck to the lower edge of the fender, and means on the upper end of said sheet securable to the filling neck and acting to conform a portion of the upper end of the sheet to the lower side of the filling neck and suspend said sheet in effective relation to said filling neck and the fender.

2. A protector for the area of an automobile fender below a gasoline tank filling neck at the upper part of the fender, said protector comprising a flexible gasoline impervious sheet to depend in protective relation to the said area of the fender from the filling neck to a point below the lower edge of the fender, the upper end of said sheet having a recess curved to conform to the curvature of the underside of the filling neck, and securing means on the upper end of said sheet straddling said recess for embracing the upper side of the filling neck for holding said sheet in place.

3. A protector for the area of an automobile fender below a gasoline tank filling neck at the upper part of the fender, said protector comprising a flexible gasoline impervious sheet to depend in protective relation to the said area of the fender from the filling neck to a point below the lower edge of the fender, the upper end of said sheet having a recess curved to conform to the curvature of the underside of the filling neck, and securing means on the upper end of said sheet straddling said recess for embracing the upper side of the filling neck for holding said sheet in place, said securing means comprising a strap secured at its opposed ends to the upper end of said sheet at opposite sides of said recess.

4. A protector for the area of an automobile fender below a gasoline tank filling neck at the upper part of the fender, said protector comprising a flexible gasoline impervious sheet to depend in protective relation to the said area of the fender from the filling neck to a point below the lower edge of the fender, the upper end of said sheet having a recess curved to conform to the curvature of the underside of the filling neck, and securing means on the upper end of said sheet straddling said recess for embracing the upper side of the filling neck for holding said sheet in place, said securing means comprising a strap secured at its opposed ends to the upper end of said sheet at opposite sides of said recess, said strap being stretchable to accommodate filling necks of different diameters.

EDWARD W. WAGNER.

REFERENCES CITED

The following references are of record in the file of this patent:

UNITED STATES PATENTS

| Number | Name | Date |
|---|---|---|
| 581,977 | Clingman | May 4, 1897 |
| 2,208,989 | Lewis | July 23, 1940 |

FOREIGN PATENTS

| Number | Country | Date |
|---|---|---|
| 204,829 | Switzerland | May 31, 1939 |
| 297,631 | Great Britain | Sept. 27, 1928 |